United States Patent
Mammen et al.

(10) Patent No.: US 10,644,895 B1
(45) Date of Patent: May 5, 2020

(54) RECOVERING MULTICAST DATA TRAFFIC DURING SPINE RELOAD IN SOFTWARE DEFINED NETWORKS

(71) Applicant: Cisco Technology, Inc., San Jose, CA (US)

(72) Inventors: Biju M. Mammen, Santa Clara, CA (US); Sundher Narayanaswamy, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 7 days.

(21) Appl. No.: 16/172,640

(22) Filed: Oct. 26, 2018

(51) Int. Cl.
*H04L 12/18* (2006.01)
*H04L 29/12* (2006.01)
(Continued)

(52) U.S. Cl.
CPC ............ *H04L 12/185* (2013.01); *H04L 45/64* (2013.01); *H04L 45/7457* (2013.01);
(Continued)

(58) Field of Classification Search
CPC ... H04L 12/1845; H04L 12/185; H04L 45/64; H04L 45/7457; H04L 45/70; H04L 45/74;
(Continued)

(56) References Cited

U.S. PATENT DOCUMENTS 6,754,210 B1 * 6/2004 Ofek .................. H04L 12/6418
370/389

8,560,646 B1 * 10/2013 Sivasubramanian ... H04L 41/08
709/220
(Continued)

FOREIGN PATENT DOCUMENTS

WO        2015077878 A1      6/2015

OTHER PUBLICATIONS vmwre.com, "vSphere Networking," EN-002315-03, 246 pages, accessed online Oct. 9, 2018.
(Continued)

*Primary Examiner* — Kevin D Mew
(74) *Attorney, Agent, or Firm* — Patterson + Sheridan, LLP (57) ABSTRACT

Embodiment provide recovering multicast data traffic during spine reload in software defined networks by identifying interfaces available between spine switches and a public network in a site; identifying Group Internet Protocol-outer (GIPo) addresses that handle multicast communications between endpoints associated together in a bridge domain, wherein the endpoints are connected via leaf switches in communication with the spine switches in a Clos topology; assigning each GIPo address to one virtual interface group (ViG) of a plurality of ViGs to generate GIPo-to-ViG mappings; distributing the GIPo-to-ViG mappings to the spine and leaf switches; assigning each ViG to one Interface as first ViG-to-Interface mappings; distributing the first ViG-to-Interface mappings to the spine and leaf switches and; when a number of available Interfaces changes, reassigning each ViG to one currently-available Interface as second ViG-to-Interface mappings; and distributing the second ViG-to-Interface mappings to the spine switches and to the leaf switches.

20 Claims, 6 Drawing Sheets

(51) Int. Cl.
*H04L 12/715* (2013.01)
*H04L 12/933* (2013.01)
*H04L 12/931* (2013.01)
*H04L 12/743* (2013.01)

(52) U.S. Cl.
CPC ...... *H04L 49/1507* (2013.01); *H04L 49/1515* (2013.01); *H04L 49/201* (2013.01); *H04L 49/354* (2013.01); *H04L 61/2069* (2013.01)

(58) Field of Classification Search
CPC . H04L 45/741; H04L 45/745; H04L 49/1507; H04L 49/1515; H04L 49/201; H04L 49/354; H04L 61/2069
See application file for complete search history.

(56) References Cited

U.S. PATENT DOCUMENTS

| | | | | |
|---|---|---|---|---|
| 9,331,946 | B2* | 5/2016 | Okita | H04L 47/125 |
| 9,401,872 | B2 | 7/2016 | Vobbilisetty et al. | |
| 9,407,599 | B2* | 8/2016 | Koponen | H04L 47/12 |
| 9,559,854 | B2 | 1/2017 | Dong et al. | |
| 9,930,149 | B2 | 3/2018 | Thyamagundalu et al. | |
| 2003/0088696 | A1* | 5/2003 | McCanne | H04L 12/1836 709/238 |
| 2009/0010152 | A1* | 1/2009 | Ofek | H04L 47/56 370/216 |
| 2014/0059537 | A1* | 2/2014 | Kamble | G06F 9/45558 718/1 |
| 2014/0269415 | A1* | 9/2014 | Banavalikar | H04L 12/185 370/254 |
| 2014/0269705 | A1* | 9/2014 | DeCusatis | H04L 45/52 370/390 |
| 2015/0124822 | A1* | 5/2015 | Chu | H04L 45/22 370/392 |
| 2017/0078188 | A1* | 3/2017 | Allan | H04L 12/4633 |
| 2017/0078198 | A1* | 3/2017 | Nellikar | H04L 45/745 |

OTHER PUBLICATIONS

Radhika Niranjan Mysore, Andreas Pamboris, Nathan Farrington, Nelson Huang, Pardis Miri, Sivasankar Radhakrishnan, Vikram Subramanya, and Amin Vahdat, "PortLand: A Scalable Fault-Tolerant Layer 2 Data Center Network Fabric," SIGCOMM'09, Aug. 17-21, 2009, Barcelona, Spain, 12 pages.

Schlansker et al., "Killer Fabrics for Scalable Datacenters," 2010 IEEE International Conference on Communications </xpl/mostRecentIssue.jsp?punumber=5497983> May 23-27, 2010 (Abstract Only).

Warabino et al, "Proposal of ID Composition for Fast Location Lookup in Overlay Nodes," 2007 IEEE 66th Vehicular Technology Conference </xpl/mostRecentIssue.jsp?punumber=4349648>, Sep. 30-Oct. 3, 2007 (Abstract Only).

* cited by examiner

RECOVERING MULTICAST DATA TRAFFIC DURING SPINE RELOAD IN SOFTWARE DEFINED NETWORKS

TECHNICAL FIELD

Embodiments presented in this disclosure generally relate to software defined networks (SDN). More specifically, embodiments disclosed herein provided improvements to the speed and reliability in recovering data multicast between different sites in an SDN.

BACKGROUND

In an SDN, several remote sites may be linked together over a public network (such as the Internet) to provide a shared network fabric across several sites that are located in different physical spaces. Data may be transmitted within one site (i.e., as intra-site traffic) and may be transmitted over the public network from one site to a different site (i.e., as inter-site traffic). Traffic that travels from one site to another may be unicast by transmitting the data from one sending site to one receiving site, or may be multicast by transmitting the data from one sending site to several receiving sites. Several specifications use multicast traffic with inter-site traffic, but in light of network outages (e.g., spine reloads, buffer overloads, network congestion), are vulnerable to loops forming in the network fabric. Loops may result in network deadlock and other deleterious effects.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

One embodiment presented in this disclosure provides a method for recovering multicast data traffic during spine reload in software defined networks, the method, comprising: identifying a plurality of external interfaces available between a plurality of spine switches and a public network in a site of a network fabric; identifying a plurality of Group Internet Protocol-outer (GIPo) addresses assigned in the network fabric to handle multicast communications between endpoints associated together in a bridge domain, wherein the endpoints are connected to the network fabric via a plurality of leaf switches in communication with the plurality of spine switches; assigning each GIPo group of the plurality of GIPo addresses to one virtual interface group (ViG) of a plurality of ViGs to generate GIPo-to-ViG mappings; distributing the GIPo-to-ViG mappings to the plurality of spine switches and to the plurality of leaf switches; assigning each ViG of the plurality of ViGs to one External Interface of the plurality of External Interfaces as first ViG-to-Interface mappings; distributing the first ViG-to-Interface mappings to the plurality of spine switches and to the plurality of leaf switches; in response to detecting a change in a number of External Interfaces available at the site, re-assigning each ViG of the plurality of ViGs to one External Interface of the plurality of External Interfaces as second ViG-to-Interface mappings; and distributing the second ViG-to-Interface mappings to the plurality of spine switches and to the plurality of leaf switches.

One embodiment presented in this disclosure provides a non-transitory computer readable medium including processor-executable instructions, that when executed enable the processor to perform an operation for recovering multicast data traffic during spine reload in software defined networks, the operation comprising: identifying a plurality of External Interfaces available between a plurality of spine switches and a public network in a site of a network fabric; identifying a plurality of Group Internet Protocol-outer (GIPo) addresses assigned in the network fabric to handle multicast communications between endpoints associated together in a Bridge Domain, wherein the endpoints are connected to the network fabric via a plurality of leaf switches in communication with the plurality of spine switches; assigning each GIPo address of the plurality of GIPo addresses to one virtual interface group (ViG) of a plurality of ViGs to generate GIPo-to-ViG mappings; distributing the GIPo-to-ViG mappings to the plurality of spine switches and to the plurality of leaf switches; assigning each ViG of the plurality of ViGs to one External Interface of the plurality of External Interfaces as first ViG-to-Interface mappings; distributing the first ViG-to-Interface mappings to the plurality of spine switches and to the plurality of leaf switches; in response to detecting a change in a number of External Interfaces available at the site, re-assigning each ViG of the plurality of ViGs to one External Interface of the plurality of External Interfaces as second ViG-to-Interface mappings; and distributing the second ViG-to-Interface mappings to the plurality of spine switches and to the plurality of leaf switches.

One embodiment presented in this disclosure provides a system for recovering multicast data traffic during spine reload in software defined networks, the system, comprising: a processor; and a memory including instructions that when executed by the processor enable the system to: identify a plurality of External Interfaces available between a plurality of spine switches and a public network in a site of a network fabric; identify a plurality of Group Internet Protocol-outer (GIPo) addresses assigned in the network fabric to handle multicast communications between endpoints associated together in a Bridge Domain, wherein the endpoints are connected to the network fabric via a plurality of leaf switches in communication with the plurality of spine switches; assign each GIPo group of the plurality of GIPo addresses to one virtual interface group (ViG) of a plurality of ViGs to generate GIPo-to-ViG mappings; distribute the GIPo-to-ViG mappings to the plurality of spine switches and to the plurality of leaf switches; assign each ViG of the plurality of ViGs to one External Interface of the plurality of External Interfaces as first ViG-to-Interface mappings; distribute the first ViG-to-Interface mappings to the plurality of spine switches and to the plurality of leaf switches; in response to detecting a change in a number of External Interfaces available at the site, re-assign each ViG of the plurality of ViGs to one External Interface of the plurality of External Interfaces as second ViG-to-Interface mappings; and distribute the second ViG-to-Interface mappings to the plurality of spine switches and to the plurality of leaf switches.

EXAMPLE EMBODIMENTS

Improvements to Software Defined Networks (SDN) in the responsiveness to recovery from a spine switch reload event are realized by isolating the load balancing assignment for groups of endpoint devices from interfaces used to communicate between sites in a distributed network. Each switch assigns the group addresses of endpoint device groups to blocs of group addresses and assigns the blocs to the interfaces, rather than assigning the individual group addresses directly to the interfaces. In this strategy, when an event occurs that affects the number of interfaces available at a site, the affected site has fewer reassignments to perform, and thus may more quickly return to normal operations with the new number of interfaces. Accordingly, the network mitigates the likelihood of deadlocking and improves responsiveness and speed at which data is communicated during such an event.

Figure 1A:
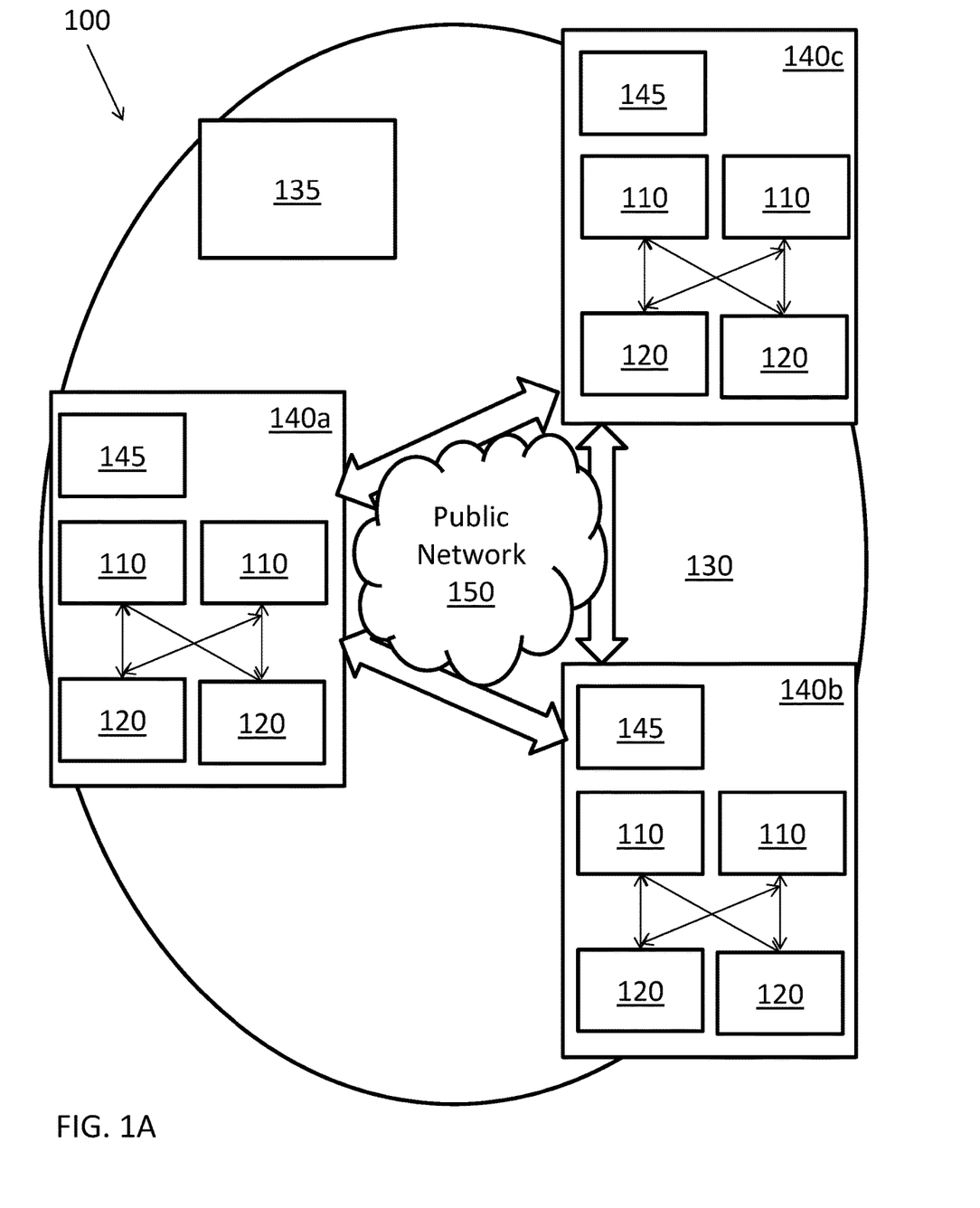
FIG. 1A illustrates a network topology 100, according to embodiments of the present disclosure.

FIG. 1A illustrates a network topology 100, according to embodiments of the present disclosure. The illustrated topology 100 is a SDN using a two-stage Clos topology, in which several remote sites 140 (individually, first site 140a, second site 140b, and third site 140c) are communicatively coupled to form a single network fabric 130 that behaves as a single SDN framework. The remote sites 140 are located in different geographic locations from one another (e.g., different countries, states, cities, buildings) and are communicatively coupled to each other via a public network 150 (e.g., the Internet) to operate as a single network despite the distances between remote elements. Although illustrated with three remote sites 140, the present disclosure may be employed in topologies 100 that include more than or less than three remote sites 140.

Figure 1B:
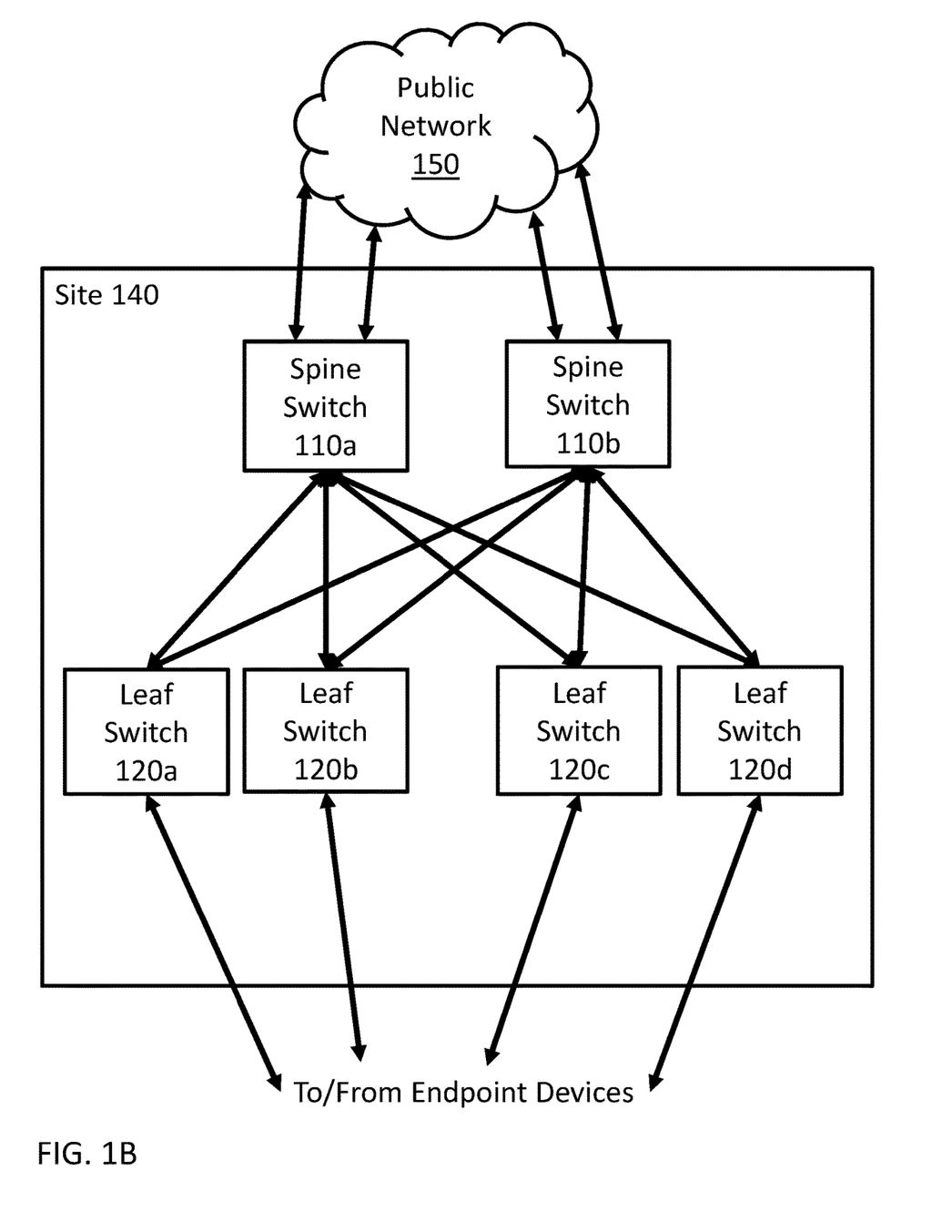
FIG. 1B illustrates details of an example site 140, according to embodiments of the present disclosure.

FIG. 1B illustrates details of an example site 140, according to embodiments of the present disclosure. Each site 140 contains several networking elements, which include at least one spine switch 110 connected to several leaf switches 120 in a two-stage Clos topology (one stage of leaf switches 120 and one stage of spine switches 110). In a Clos topology, leaf switches 120 (also referred to as Top-of-Rack (ToR) switches) send and receive communications with external devices connected to the network fabric 130, including various client computing devices and virtual machines, routers (in communication with devices outside of the network), firewalls, load balancing appliances, etc., which may collectively be referred to as "endpoints" or "endpoint devices."

The leaf switches 120 route communication flows through the spine switches 110, and the spine switches 110 route communication flows through the leaf switches 120. Stated differently, within a site 140, the spine switches 110 are not in direct communication with other spines switches 110 and the leaf switches 120 are not in direct communication with other leaf switches 120. In the illustrated network topology 100, the spine switches 110 in remote sites 140 are communicated together to link the sites 140 over the public network 150 into the network fabric 130. The spine switches 110 in each site 140 may each have one or more interfaces 110 dedicated to handling communications from the endpoints that are sent externally from the local site 140 to one or more spine switches 110 at remote sites 140 in the network fabric 130 over the public network 150.

Each site 140 includes a respective local-site controller 145 to control the associated sites 140, and one site 140 in the network fabric 130 includes a multi-site controller 135 to manage the network fabric 130. The multi-site controller 135 and local-site controllers 145 can be implemented using software, hardware, or combinations thereof. The multi-site controller 135 communicates with the local-site controllers 145 in each of the sites 140. The multi-site controller 135 can use the local-site controllers 145 to identify the namespaces for the sites 140, establish secure connections between the sites 140, and the like. For example, the multi-site controller 135 may configure the network switches in both of the sites 140 to operate as a single distributed network (e.g., with consistent Internet Protocol (IP) addresses) and to establish Virtual Private Networks (VPNs) between the sites 140.

Traffic that is destined for multiple destinations or for which the destination/destinations is/are unknown, may be referred to herein as BUM (Broadcast, Unknown, and Multicast) traffic. Inside a site 140, from an endpoint device attached to one of the leaf switches (120[a, b, c or d]), BUM traffic that ingresses one of those devices is encapsulated into a Virtual Extensible Local Area Network (VXLAN) multicast frame and it is transmitted to all of the leaf switches 120 local to the particular site 140. A unique multicast group is associated to each defined Bridge Domain of endpoints connected to the leaf switches 120. As used herein, a Bridge Domain is a Layer 2 broadcast domain of one or more external devices or virtual machines (generally, endpoints) connected to the leaf switches 120 in the network fabric 130. Once a multicast frame is received by the leaf switches 120, each leaf switch 120 then forwards the multicast frame to the connected endpoint devices that are part of that Bridge Domain, or drops the multicast frame, depending on the type of BUM frame and on the specific Bridge Domain configuration.

The spine switches 110 and the leaf switches 120 are specialized computer networking devices for routing data within a network. Example hardware that may be used in a spine switch 110 or leaf switch 120 is discussed in relation to FIG. 4.

Figure 2A:
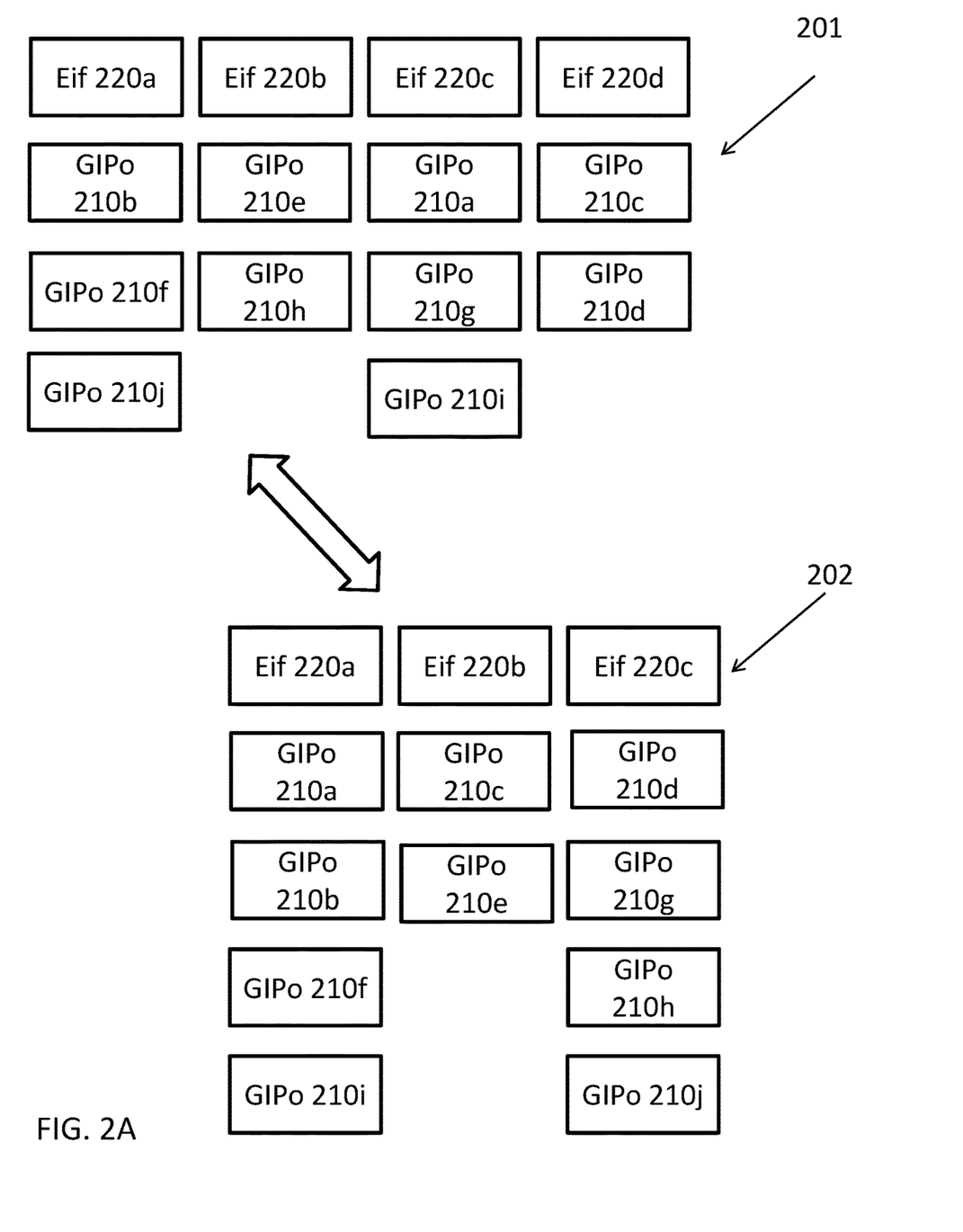
FIGS. 2A and 2B illustrate groupings of example domains, according to embodiments of the present disclosure.
Figure 2B:
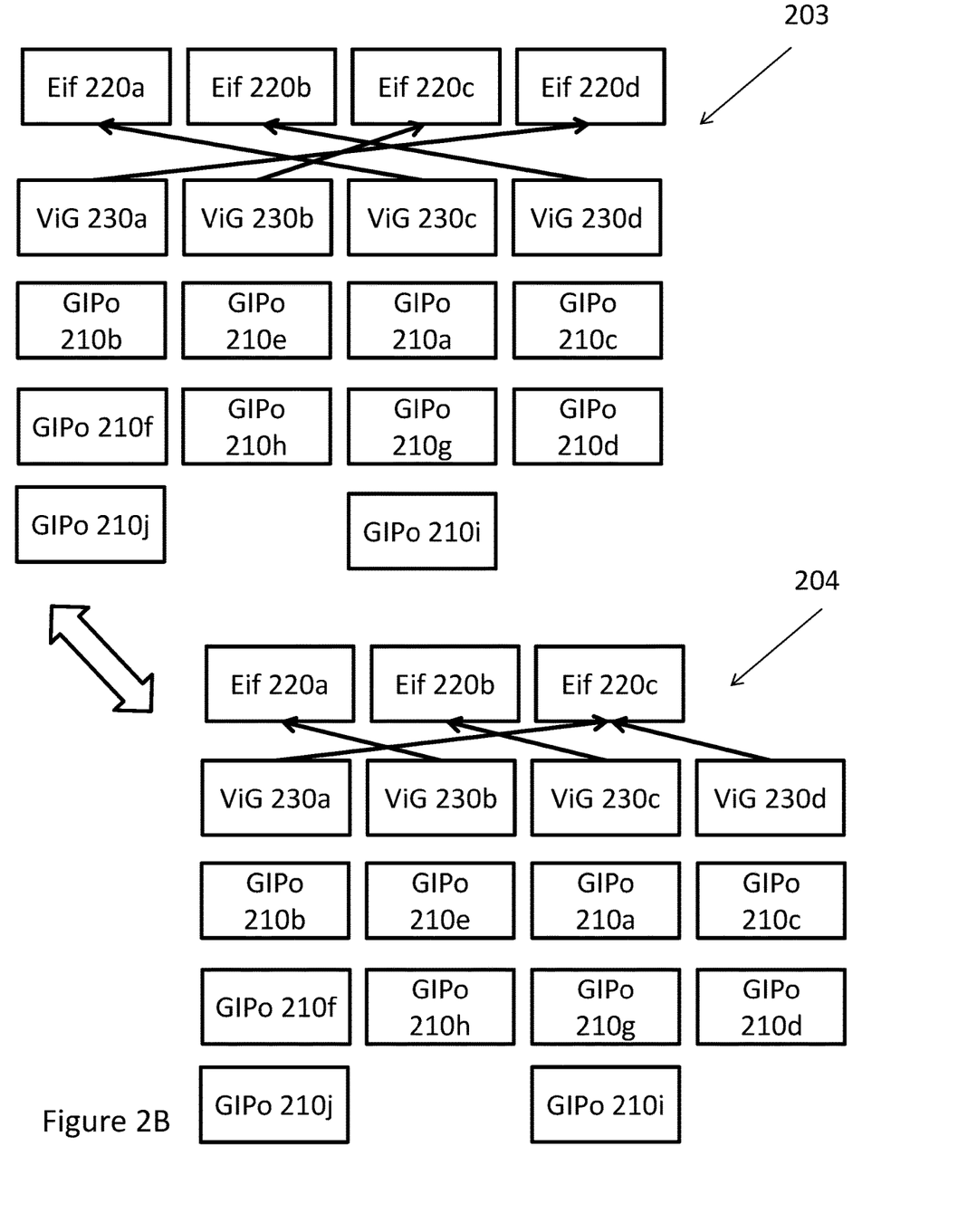

FIGS. 2A and 2B illustrate groupings of example domains in the network, according to embodiments of the present disclosure. As used herein, a Group Internet Protocol-outside (GIPo) 210 is a multicast group Internet Protocol address that is used in Layer 3 for handling BUM traffic for a particular Bridge Domain that ensures delivery of multi-destination frames to the endpoints that belong to that particular Bridge Domain, and not to other endpoints belonging to other Bridge Domains. The GIPo 210 provides a multicast Internet Protocol address for packets and frames to direct the transmission and forwarding of a several endpoints belonging to a Bridge Domain. As used herein, an External Interface (Eif) 220 is a link provided by a spine switch 110 to the public network 150 to link remote sites 140. Each site 140 may include several spine switches 110 and each spine switch 110 may provide multiple Eifs 220, and one Eif 220 may have several GIPos 210 assigned thereto, but in one embodiment each GIPo 210 is assigned to one Eif 220.

Each spine switch 110 in the network fabric 130 independently computes the assignment of GIPos 210 to Eifs 220 in the control plane, and arrives at the same assignment via a hashing algorithm in a process referred to as striping. Striping (or re-striping, when the assignments are adjusted) occurs when an Eif 220 is added to the network fabric 130 (e.g., during initialization of the network fabric 130, adding or bringing back online a spine switch 110) or when an Eif 220 is removed from the network fabric 130 (e.g., during a reset of a spine switch 110).

Striping provides for load balancing between the available Eif 220 for the various GIPo 210 so that each interface of the spine switches 110 available for communication with the public network 150 is expected to carry a substantially even portion of the traffic between sites 140. Load balancing in a direct re-striping implementation may be done to prioritize a substantially even number of GIPos 210 assigned to each Eif 220 (e.g., ±10% or ±2 GIPos 210 per Eif 220), a substantially even number of endpoint devices are assigned to each Eif 220 (e.g., ±10% or ±2 endpoints per Eif 220), or a substantially even expected amount of traffic is carried by each Eif 220 (e.g., ±10% communications per time window per Eif 220) based on historic traffic levels, depending on the setup of the site 140 or the network fabric 130.

FIG. 2A illustrates a direct re-striping of GIPos 210? to Eifs 220. Depending on the reason for re-striping (e.g., whether an Eif 220 is removed or added to the network fabric 130), striping 201 or striping 202 may be the start or the end point for the re-striping. For example, striping 201 may transition to striping 202 in response to Eif 220*d* becoming unavailable (e.g., the spine switch 110 providing the Eif 220*d* going offline) or striping 202 may transition to striping 201 in response to Eif 220*d* becoming available (e.g., adding a new spine switch 110 to the network fabric 130).

When a change affects the number of available Eif 220 in a direct striping implementation, as per FIG. 2A, the distribution of every GIPo 210 to every Eif 220 may be affected. As illustrated, if Eif 220*d* were to become unavailable, the GIPos 210*c* and 210*d* assigned to Eif 200*d* in striping 201 would be reassigned to Eifs 200*a*-*c*, but the other GIPos 210 previously assigned to EiFs 220*a*-*c* would also be reassigned. As shown in FIG. 2A, for example, GIPo 210*a* is assigned to Eif 220*c* in striping 201, but is assigned to Eif 220*a* in striping 202. When hashing the GIPo 210 among a number of buckets defined by and corresponding to the number of Eif 220 available, the complexity of the hashing is affected by the number of GIPos 210 in the network fabric 130. In deployments in which more GIPos 210 are included in the network fabric 130, a restriping operation may take longer to complete due to the greater complexity in assigning more GIPos 210 among the Eif 220 than a deployment with fewer GIPos 210 but an equal number of Eif 220.

When a GIPo 210 is moved from one Eif 220 to another Eif 220, several operations are performed on the network switches in both the control plane and the data plane. For example, the network switches may perform a leave operation from the original Eif 220, a join operation at the new Eif 220, setting up an Outgoing Interface (OIF) and Reverse Path Forwarding (RPF) with the new Eif 220, etc. Performing each of these operations for each GIPo 210 may take signification computing resources, and result in downtime that negatively affects the performance of the network fabric 130.

FIG. 2B illustrates an indirect re-striping of GIPos 210 to Eifs 220. Depending on the reason for re-striping (e.g., whether an Eif 220 is removed or added to the network fabric 130), striping 203 or striping 204 may be the start or the end point for the re-striping. For example, striping 203 may transition to striping 204 in response to Eif 220*d* becoming unavailable (e.g., the spine switch 110 providing the Eif 220*d* going offline) or striping 204 may transition to striping 203 in response to Eif 220*d* becoming available (e.g., adding a new spine switch 110 to the network fabric 130). In addition to the GIPos 210 and the Eifs 220, the spine switches 110 include a third grouping; a virtual interface group 230 (ViG) that the GIPos 210 are directly assigned to, and that are directly assigned to the Eifs 220 such that GIPos 210 are indirectly re-striped to the Eifs 220 via the ViGs 230. The number of GIPos 210 assigned to a ViG 230, and the number of ViGs 230 created in a given site 140 may vary based on the setup of the site 140 or the network fabric, but it will be appreciated that the number of ViGs 230 is (significantly) less than the number of GIPos 210, and may be equal to the number of Equal-Cost Multi-Path (ECMP) routing paths between the spine switches 110 and the public network 150.

When a change affects the number of available Eif 220 in an indirect striping implementation, as per FIG. 2B, the distribution of the GIPo 210 to the ViGs 230 remain unaffected, and instead the distribution of ViGs 230 over the Eif 220 domain is adjusted. As illustrated, if Eif 220*d* were to become unavailable, the GIPos 210*b*, 210*f*, and 210*j* assigned to ViG 230*a* which is assigned to Eif 200*d* in striping 203, would remain assigned to ViG 230*a*, but the assignment of ViGs 230 to the remaining Eifs 220 would be affected to thereby reassign the GIPos 210 to the remaining Eif 220 indirectly. As shown in FIG. 2B, for example, Eif 220*c* is assigned ViG 230*b* in striping 203 and is assigned ViG 230*a* and ViG 230*d* in striping 204.

In an indirect striping implementation, the control plane provides the data plane with the mappings of GIPos 210 to ViGs 230 in an initial striping, and provides the mappings of ViGs 230 to Eifs 220 in the initial striping and each subsequent re-striping. The ViGs 230 allow for several GIPos 210 to be bundled together when restriping; moving or staying en bloc from Eif 220 to Eif 220, and thus reducing the number of OIF and RPF updates to the data plane, the amount of data transmitted to the network switches to affect the updates, and reducing the time required to recover from a change to the number of available Eif 220. When load balancing in an indirect re-striping implementation, the Eifs 220 are balanced by ViGs 230, and not the individual GIPOs 210. As such, even though assignment of ViGs 230 to Eifs 220 may be substantially even (e.g., within ±10% or ±2 ViG 230 per Eif 220), an indirect re-striping implementation may be less equitable than a direct re-striping implementation when comparing the number of GIPos 210 per Eif 220.

By assigning GIPos 210 indirectly in blocs to the Eif 220 via ViGs 230, the site 140 isolates the GIPos 210 from the churn and update domains. Any time the number of available Eif 220 change, the ViG-to-Interface mappings are updated in the hardware of the network switches, thus reducing the number of updates required from the number of GIPos to the number of ViGs and reducing the number of associations that need to be republished to the hardware of the network switches, often by an order of magnitude (e.g., from 8000 to 64). Due to the lower number of updates needed in a given re-striping, the recovery time of the multicast data traffic may be improved. The improvement in recovery time may be particularly apparent in network fabrics 130 having a large number GIPos 210 defined therein.

Figure 3:
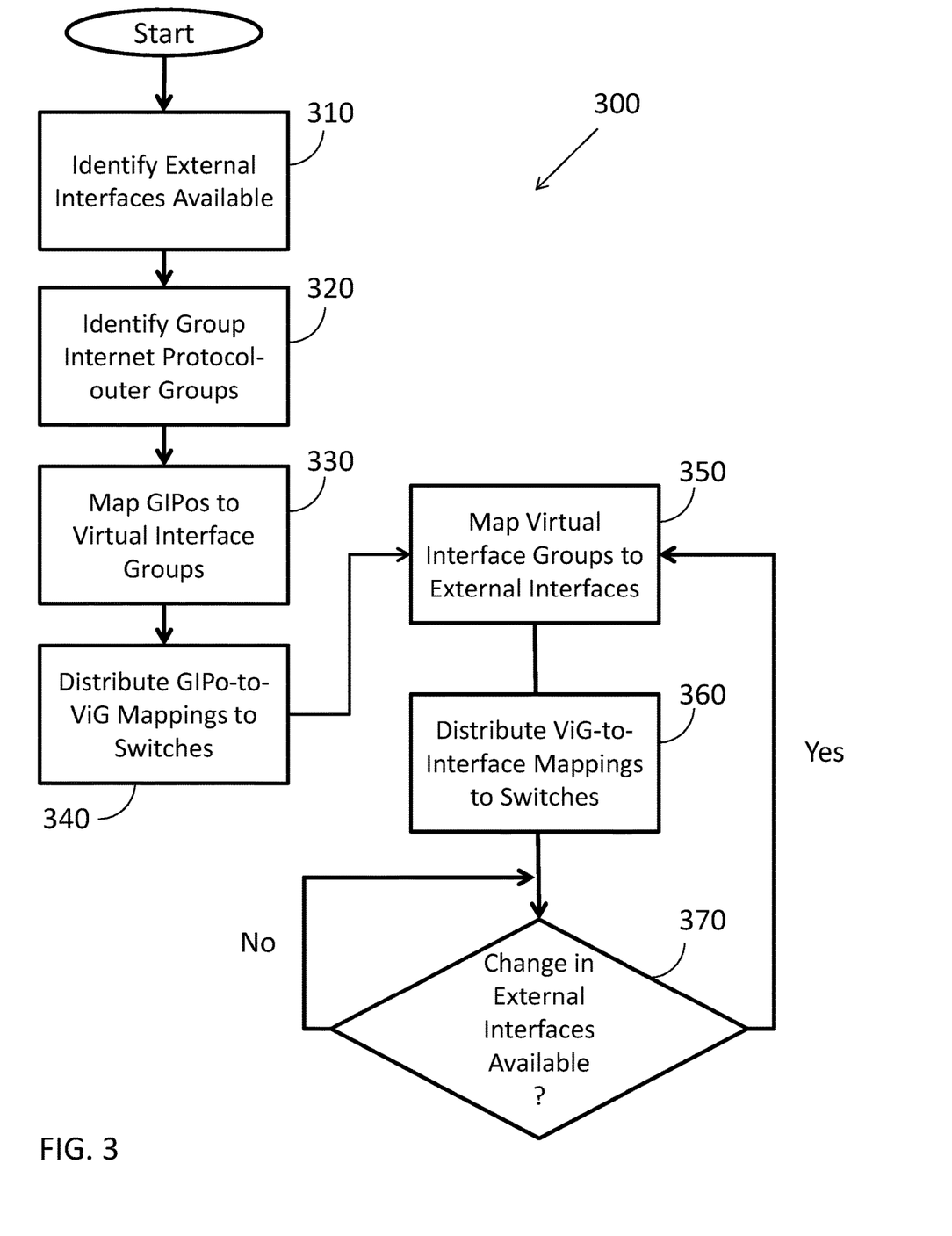
FIG. 3 is a flowchart of a method for recovering multicast data traffic during spine reload in software defined networks, according to embodiments of the present disclosure.

FIG. 3 is a flowchart of a method 300 for recovering multicast data traffic during spine reload in SDNs according to embodiments of the present disclosure. Method 300 begins with block 310, where each of the spine switches 110 in a site 140 identifies a number of Eifs 220 available within the site 140. At block 320, each of the spine switches 110 in a site 140 identifies a number of GIPos 210 served in the network fabric 130 whose endpoints are reachable by the leaf switches 120 of the site 140.

At block 330, the spine switch 110 performs a first hash operation to uniquely map GIPos 210 to ViGs 230 for the site 140. In some embodiments, the number of ViGs 230 is equal to the number of ECMP paths for the site 140. Each ViG 230 may include a substantially equal number of GIPos 210 (e.g., ±10% or ±2 GIPOs 210 per ViG 230) to provide GIPos 210 in bundles of approximately equal number to evenly assign the GIPos 210 across the ViGs 230. Each spine switch 110 performs the first hash operation to yield the same assignment of particular GIPos 210 to particular ViGs 230 as the other spines switches 110 at a given site 140.

At block 340, the spine switch 110 distributes the GIPo-to-ViG mappings created per block 330 to the network switches in the site 140. In various embodiments, the GIPo-to-ViG mappings are provided from the control plan to the data plane such that each intervening component between the control plane and endpoint hardware host the GIPo-to-ViG mapping in local memory. Method 300 assumes a steady state in the number of GIPos 210 and ViGs 230 available, but may restart from block 310 if the number of GIPos 210 and ViGs 230 change. Accordingly, the GIPo-to-ViG mappings are provided once per execution of method 300.

At block 350, the spine switch 110 performs a second hash operation to map ViGs 230 to available Eifs 220 for the site 140. In various embodiments, the spine switches 110 evenly assign the ViGs 230 across the available Eif 220 so that each Eif 220 is at least partially load balanced to have substantially the same number of ViGs 230 assigned thereto (e.g., ±10% or ±2 ViGs 230 per Eif 220).

At block 360, the spine switch 110 distributes the ViG-to-Physical Interface mappings (also referred to as ViG-to-PHY or ViG-to-Interface mappings) created per block 350 to the network switches in the site 140. In various embodiments, the ViG-to-Physical Interface mappings are provided from the control plane to the data plane such that each intervening component between the control plane and endpoint hardware host the ViG-to-Physical Interface mapping in local memory.

At block 370, the spine switch 110 determines whether a change in the Eifs 220 available for the site 140 has occurred. In various embodiments, a trigger event such as the loss or addition of an available Eif 220 causes the spine switches 110 to perform the determination of block 370. When it is determined that no change has occurred in the Eifs 220 available to the site 140, method 300 may return to block 370, and the network switches retain the current GIPo-to-ViG mappings and the current ViG-to-Interface mappings. When it is determined that a change has occurred in the Eifs 220 available to the site 140, method 300 may return to block 350, and remap the ViGs 230 to the different Eifs 220 now available to the site 140. The new ViG-to-Interface mappings replace the prior ViG-to-Interface mappings when distributed.

Figure 4:
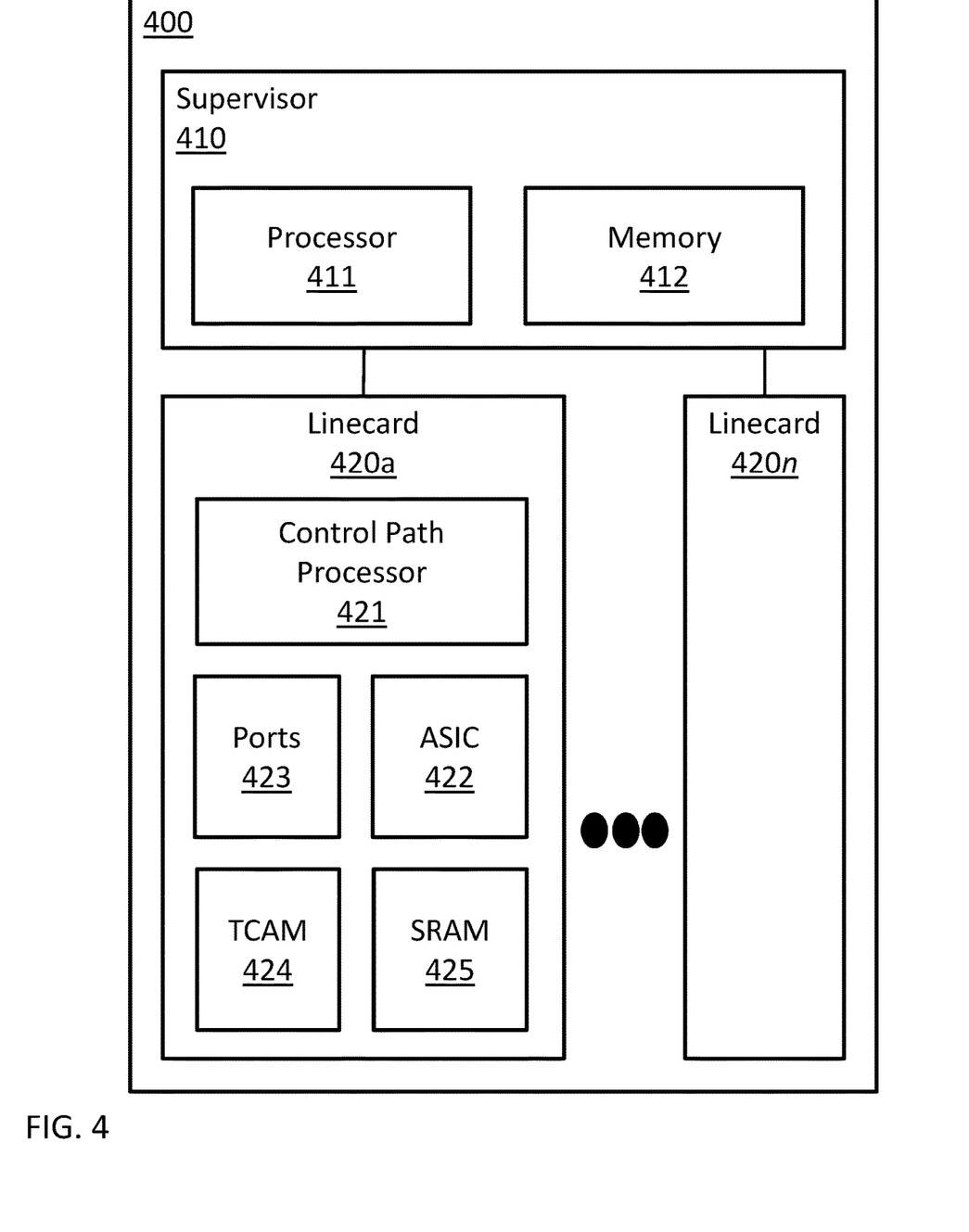
FIG. 4 illustrates hardware of a network switch, according to embodiments of the present disclosure.

FIG. 4 illustrates hardware of a network switch 400, as may be used as one of a spine switch 110 or a leaf switch 120 according to embodiments of the present disclosure. The network switch 400 includes a supervisor module 410 and a plurality of linecards 420*a-n*. The supervisor module 410 includes a processor 411 and memory 412. The memory 412 stores software instructions that are executed by the processor 411. In particular, the memory 412 stores instructions for recovering multicast data traffic during spine reload in SDNs (e.g., by indirectly striping the Bridge Domains of endpoint devices to the Eif 220) according to the present disclosure so as to reduce system downtime and mitigate the effect of system downtime on the network fabric 130.

Each linecard 420 includes a control path processor 421, an Application Specific Integrated Circuit (ASIC) 422, a plurality of ports/interfaces 423 coupled to the ASIC 422, a Ternary Content-Addressable Memory (TCAM) 424, and a Static Random Access Memory (SRAM) 425. The control path processor 421 is a CPU/processor that receives configuration commands from the supervisor module 410 to program the TCAM 424 and SRAM 425. The ASIC 422 is a hardware device that directs an incoming packet at a port/interface 423 to a particular other port/interface on another device based on the content of the TCAM 424 and SRAM 425. The ASIC 422 may buffer received packets in the TCAM/SRAM for delayed transmission to the other device. There may be multiple TCAM/SRAM pairs in a linecard 420.

Each port 423 may be associated with a connection to a device internal to the site 140 (e.g., a spine switch 110 or leaf switch 120), an endpoint device (if the network switch 400 is a leaf switch 120), or the public network 150 (if the network switch 400 is a spine switch 110). When a port 423 is in communication with the public network 150, that port 423 is an Eif 220, which may be associated with one or more GIPos 210 via a ViG 230 for handling BUM traffic according to the present disclosure. The GIPos 210 and configurations for the related Bridge Domain that are assigned to the port 423 of a particular linecard 420 may be stored in the TCAM/SRAM to handle BUM traffic addressed to those GIPos 210.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product.

Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
identifying a plurality of external interfaces available between a plurality of spine switches and a public network in a site of a network fabric;
identifying a plurality of Group Internet Protocol-outer (GIPo) addresses assigned in the network fabric to handle multicast communications between endpoints associated together in a bridge domain, wherein the endpoints are connected to the network fabric via a plurality of leaf switches in communication with the plurality of spine switches;
assigning each GIPo address of the plurality of GIPo addresses to one virtual interface group (ViG) of a plurality of ViGs to generate GIPo-to-ViG mappings;
distributing the GIPo-to-ViG mappings to the plurality of spine switches and to the plurality of leaf switches;
assigning each ViG of the plurality of ViGs to one External Interface of the plurality of External Interfaces as first ViG-to-Interface mappings;
distributing the first ViG-to-Interface mappings to the plurality of spine switches and to the plurality of leaf switches;
in response to detecting a change in a number of External Interfaces available at the site, re-assigning each ViG of the plurality of ViGs to one External Interface of the plurality of External Interfaces as second ViG-to-Interface mappings; and
distributing the second ViG-to-Interface mappings to the plurality of spine switches and to the plurality of leaf switches.

2. The method of claim 1, wherein a GIPo-to-ViG mapping and a ViG-to-Interface mapping distributed to a network switch configure the network switch to route multicast communications for a particular GIPo address through a particular External Interface of the plurality of External interfaces as identified in via the GIPo-to-ViG mapping and the ViG-to-Interface mapping.

3. The method of claim 1, wherein each GIPo address of the plurality of GIPo addresses is assigned to the one ViG of the plurality of ViGs such that the plurality of GIPos are evenly assigned across the plurality of ViGs.

4. The method of claim 1, wherein each ViG of the plurality of ViGs is assigned to the one External Interface of the plurality of External Interfaces such that the plurality of ViGs are evenly assigned across the plurality of External Interfaces.

5. The method of claim 1, wherein at least one spine switch of the plurality of spine switches provides more than one External Interface.

6. The method of claim 1, wherein the public network links a plurality of sites in the network fabric, wherein spine switches at each site are communicated to spine switches at remote sites via External Interfaces and the public network.

7. The method of claim 1, wherein a number of ViGs in the plurality of ViGs is equal to a maximum number of available External Interfaces at the site.

8. A non-transitory computer readable medium including processor-executable instructions, that when executed enable the processor to perform an operation, the operation comprising:
    identifying a plurality of External Interfaces available between a plurality of spine switches and a public network in a site of a network fabric;
    identifying a plurality of Group Internet Protocol-outer (GIPo) addresses assigned in the network fabric to handle multicast communications between endpoints associated together in a Bridge Domain, wherein the endpoints are connected to the network fabric via a plurality of leaf switches in communication with the plurality of spine switches;
    assigning each GIPo group of the plurality of GIPo addresses to one virtual interface group (ViG) of a plurality of ViGs to generate GIPo-to-ViG mappings;
    distributing the GIPo-to-ViG mappings to the plurality of spine switches and to the plurality of leaf switches;
    assigning each ViG of the plurality of ViGs to one External Interface of the plurality of External Interfaces as first ViG-to-Interface mappings;
    distributing the first ViG-to-Interface mappings to the plurality of spine switches and to the plurality of leaf switches;
    in response to detecting a change in a number of External Interfaces available at the site, re-assigning each ViG of the plurality of ViGs to one External Interface of the plurality of External Interfaces as second ViG-to-Interface mappings; and
    distributing the second ViG-to-Interface mappings to the plurality of spine switches and to the plurality of leaf switches.

9. The non-transitory computer readable medium of claim 8, wherein a GIPo-to-ViG mapping and a ViG-to-Interface mapping distributed to a network switch configure the network switch to route multicast communications for a particular GIPo address through a particular External Interface of the plurality of External interfaces as identified in via the GIPo-to-ViG mapping and the ViG-to-Interface mapping.

10. The non-transitory computer readable medium of claim 8, wherein each GIPo address of the plurality of GIPo addresses is assigned to the one ViG of the plurality of ViGs such that the plurality of GIPos are evenly assigned across the plurality of ViGs.

11. The non-transitory computer readable medium of claim 8, wherein each ViG of the plurality of ViGs is assigned to the one External Interface of the plurality of External Interfaces such that the plurality of ViGs are evenly assigned across the plurality of External Interfaces.

12. The non-transitory computer readable medium of claim 8, wherein at least one spine switch of the plurality of spine switches provides more than one External Interface.

13. The non-transitory computer readable medium of claim 8, wherein the public network links a plurality of sites in the network fabric, wherein spine switches at each site are communicated to spine switches at remote sites via External Interfaces and the public network.

14. A system, comprising:
    a processor; and
    a memory including instructions that when executed by the processor enable the system to:
        identify a plurality of External Interfaces available between a plurality of spine switches and a public network in a site of a network fabric;
        identify a plurality of Group Internet Protocol-outer (GIPo) addresses assigned in the network fabric to handle multicast communications between endpoints associated together in a Bridge Domain, wherein the endpoints are connected to the network fabric via a plurality of leaf switches in communication with the plurality of spine switches;
        assign each GIPo address of the plurality of GIPo addresses to one virtual group (ViG) of a plurality of ViGs to generate GIPo-to-ViG mappings;
        distribute the GIPo-to-ViG mappings to the plurality of spine switches and to the plurality of leaf switches;
        assign each ViG of the plurality of ViGs to one External Interface of the plurality of External Interfaces as first ViG-to-Interface mappings;
        distribute the first ViG-to-Interface mappings to the plurality of spine switches and to the plurality of leaf switches;
        in response to detecting a change in a number of External Interfaces available at the site, re-assign each ViG of the plurality of ViGs to one External Interface of the plurality of External Interfaces as second ViG-to-Interface mappings; and
        distribute the second ViG-to-Interface mappings to the plurality of spine switches and to the plurality of leaf switches.

15. The system of claim 14, wherein a GIPo-to-ViG mapping and a ViG-to-Interface mapping distributed to a network switch configure the network switch to route multicast communications for a particular GIPo address through a particular External Interface of the plurality of External interfaces as identified in via the GIPo-to-ViG mapping and the ViG-to-Interface mapping.

16. The system of claim 14, wherein each GIPo address of the plurality of GIPo addresses is assigned to the one ViG of the plurality of ViGs such that the plurality of GIPos are evenly assigned across the plurality of ViGs.

17. The system of claim 14, wherein each ViG of the plurality of ViGs is assigned to the one External Interface of the plurality of External Interfaces such that the plurality of ViGs are evenly assigned across the plurality of External Interfaces.

18. The system of claim 14, wherein at least one spine switch of the plurality of spine switches provides more than one External Interface.

19. The system of claim 14, wherein the public network links a plurality of sites in the network fabric, wherein spine switches at each site are communicated to spine switches at remote sites via External Interfaces and the public network.

20. The system of claim 14, wherein a number of ViGs in the plurality of ViGs is equal to a maximum number of available External Interfaces at the site.

* * * * *